United States Patent [19]

Hahn et al.

[11] 4,190,220
[45] Feb. 26, 1980

[54] METHOD AND APPARATUS FOR BRAKING RAIL-GUIDED VEHICLES AUTOMATICALLY AND ACCURATELY WITH RESPECT TO A DECELERATION DISTANCE

[75] Inventors: Karl Hahn; Herbert Bohms, both of Berlin; Johannes Strecker, Feldafing; Wilhelm Landes, Neusäss-Westheim, all of Fed. Rep. of Germany

[73] Assignee: Licentia Patent-Verwaltungs-G.m.b.H., Fed. Rep. of Germany

[21] Appl. No.: 880,457

[22] Filed: Feb. 23, 1978

[30] Foreign Application Priority Data

Feb. 23, 1977 [DE] Fed. Rep. of Germany ....... 2708361

[51] Int. Cl.$^2$ ............................................. B61L 3/00
[52] U.S. Cl. ................................. 246/182 B; 104/152
[58] Field of Search ................... 104/149, 152, 153; 246/63, 167 R, 182 R, 182 B, 187 R, 187 B; 364/426

[56] References Cited

U.S. PATENT DOCUMENTS 4,066,230   1/1978   Nohmi et al. ............... 246/187 B X

FOREIGN PATENT DOCUMENTS 1213471   3/1966   Fed. Rep. of Germany ....... 246/182 B Primary Examiner—Reinhard J. Eisenzopf
Attorney, Agent, or Firm—McGlew and Tuttle

[57] ABSTRACT

The method uses a computer which, in accordance with a function based on either time or distance of deceleration, delivers speed values to a control apparatus for the braking force of the vehicle. The control apparatus is utilized to deliver correcting control signals for correcting the braking forces, and a fixed braking force control signal is provided and has a magnitude which is rated for a braking which is accurate as to the deceleration distance under conditions of an ideal track and an average train length, as when the rail-guided vehicles are locomotive-drawn railroad trains. The correcting control signals are combined, after a first time delay and in the correct mathematical polarity, or relationship, to the fixed braking force control signal. Upon actuation of the vehicle brake, only the fixed braking force control signal is applied and the computer is actuated for picking up and storing the actual speed at this instant. It is only after the expiration of a first delay time that the computer proceeds to compute the reference speed or correcting speed values while starting from the stored actual speed as the initial reference value, and the control apparatus is enabled only after a second delay time has expired. As the actual speed approaches the desired speed, following deceleration, the fixed braking force control signal is switched off at a differential period of time in advance and the connections are changed from the reference speed values of the computer to the desired speed as a new reference value. The apparatus includes a differential amplifier to which are applied the desired speed value and the actual speed value and which controls a limit-value stage switch, upon exceeding a threshold value, actuates the computer and brings a first switching element, following the computer, and a second switching element, into closed positions. The first switching element is connected to one input and the desired speed is applied to the other input of a maximum evaluator whose output is connected to a braking force controller which is controlled by the evaluator output and by the actual speed and which is further actuable, with delay, by the computer. The braking force controller delivers braking force control signals to a summing point to which a fixed basic braking force control signal is applied through the second switching element.

7 Claims, 3 Drawing Figures

METHOD AND APPARATUS FOR BRAKING RAIL-GUIDED VEHICLES AUTOMATICALLY AND ACCURATELY WITH RESPECT TO A DECELERATION DISTANCE

FIELD AND BACKGROUND OF THE INVENTION

This invention relates to a method of braking rail-guided vehicles, particularly locomotive-drawn railroad trains, automatically and accurately with respect to a deceleration distance, while using a computer which, in accordance with a predetermined function based on either time or distance, delivers speed values to means controlling the braking force of the vehicle. More particularly, the present invention is directed to an improved method of this type.

For automatic target braking, it is known to use digital or analog computers which compute the respective needed reference speed as a function of the distance to be covered, i.e., the distance from the instantaneous position of the vehicle to the target point where the vehicle is to be stopped or its speed reduced to a preset value. This is expressed, for a definite constant deceleration, by a speed-distance function which, in graphic representation, follows a parabola (desired speed or stopping distance parabola) and corresponds to the desired speed variation for a braking ending with a stop or at a preset reduced speed. Upon the braking command, the speed controller tries continually, by increasing the braking force or releasing the brake, to adjust the actual speed of the vehicle to the desired or reference speed predetermined by the braking-distance parabola.

Conventional braking systems, particularly air brakes, have considerable build-up, release and dead times. For example, the building-up of the brake pressure in locomotive-drawn freight trains takes 30 to 45 seconds before the desired braking force becomes fully effective. The release of the brakes takes a still longer period of time, about 1.5 times more. These considerable delay times do not permit a sudden application or release of the brake. Due to the variety of the masses to be braked (different train lengths and loads) as well as to the topography of the track with grades in both directions, constant decelerations are hardly obtainable, so that the variables depending thereon, such as the distance covered during the braking, are influenced by casual factors and fluctuate largely.

SUMMARY OF THE INVENTION

The present invention is directed to an elimination of these drawbacks, to the effect that, for a braking from an actual speed to a lower desired or target speed, the braking distance is always reproducible, i.e., that this speed is not exceeded, irrespective of the vehicle mass or track disturbances (grade, for example).

This problem is solved by providing a method of the above-mentioned kind in which the computer-commanded controlling means delivers control signals for correcting braking forces, which correcting control signals are combined, following a first time delay and in the correct mathematical relationship, to a fixed basic braking force control signal whose magnitude is rated for a braking which is accurate as to the deceleration distance under conditions of an ideal track and an average train length.

According to a purposeful development of the method, after the brake is switched on, first, only the fixed basic braking force control signal is applied and the computer is actuated for picking up and storing the actual speed at that instant. The computer proceeds to compute the reference values of the speed only after expiration of a first delay time, while starting from the stored actual speed as the initial reference speed value and enabling the controller only upon expiration of a second delay time.

An object of the invention is to provide an improved method of braking rail-guided vehicles automatically and accurately with respect to a deceleration distance.

Another object of the invention is to provide an improved apparatus for braking rail-guided vehicles automatically and accurately with respect to a deceleration distance.

A further object of the invention is to provide such an improved method and apparatus in which the braking distance is always reproducible and is not exceeded irrespective of the vehicle mass or track disturbances, such as grades or curves.

For an understanding of the principles of the invention, reference is made to the following description of a typical embodiment thereof as illustrated in the accompanying drawings.

DESCRIPTION OF THE PREFERRED EMBODIMENT

Figure 1:
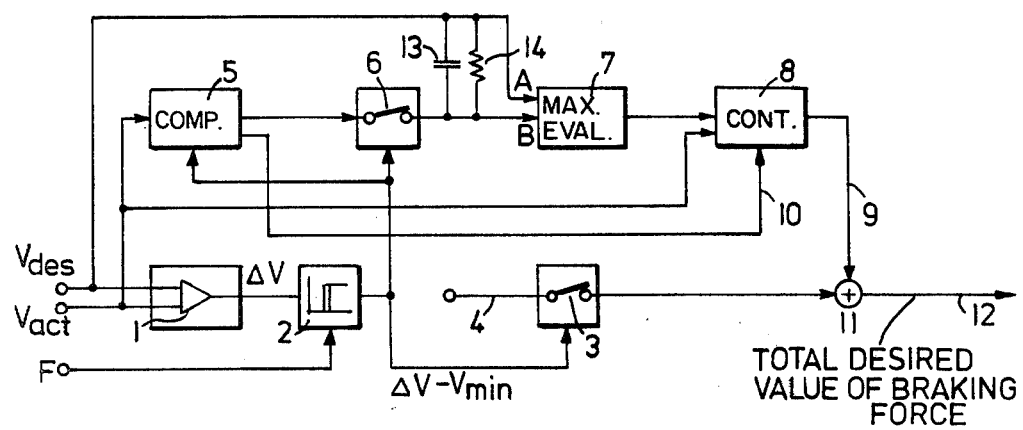
FIG. 1 is a block diagram of a circuit arrangement for performing the method of the invention.

Referring to FIG. 1, the desired speed $V_{des}$ and the actual speed $V_{act}$ of the vehicle are supplied, as analog quantities, to a differential amplifier 1. For example, there may be used an operational amplifier of the type 741 which is designed in accordance with FIG. 11.3 on page 197 of the publication by U. Tietze/Ch. Schenk: "Halbleiterschaltungstechnik" (Semiconductor Circuit Design Practice), Springer Publishing House, Berlin/Heidelberg/New York. At a variance between the values of the two quantities, a $\Delta V$ signal is delivered which, upon exceeding a minimum value, triggers a limit value stage 2. An operational amplifier operating as a Schmitt trigger may be used as the limit value stage, for example. Advantageously, here again, an operational amplifier of the type 741 may be employed, in a design corresponding to FIG. 11.131 on page 305 of the above-cited publication. Its switching threshold can be adjusted through the acting braking force F, as will be explained hereinafter.

If, for example, at an instant $t_0$ (FIG. 2), by changing the position of the brake lever, the operator adjusts the desired speed from a value a to a lower value a', the limit value stage 2 delivers a signal which simultaneously performs several functions. First, it closes a switching element 3 whereby a basic braking force control signal 4 determined by a set point is put through and the brake is switched on and builds up. In FIG. 3, the setting of this desired basic braking force 4 is shown as a rectangular step change. Its magnitude is rated for a braking which is accurate as to the deceleration distance under ideal track conditions (level sections) and with an average length or mass of the train. External disturbances, such as different train mass, grades in one or the other direction, and the like, are not taken into account as yet.

Figure 2:
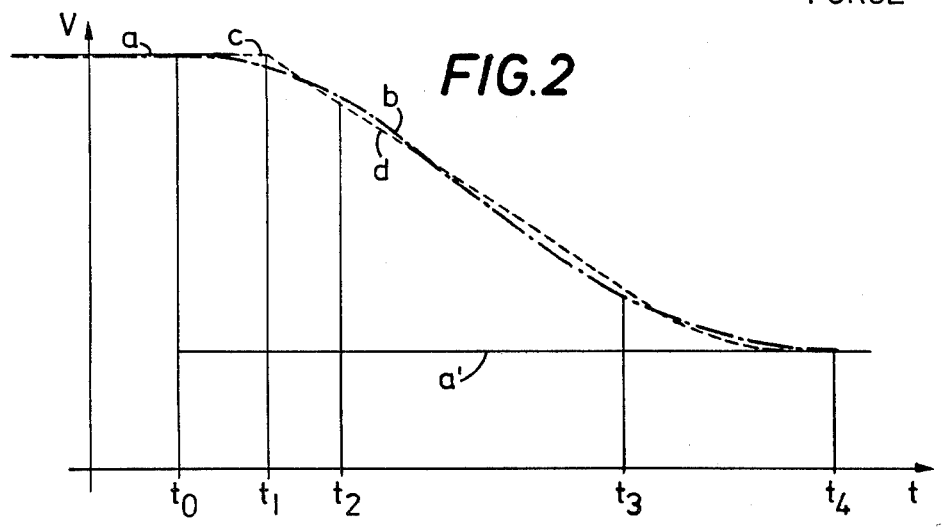
FIG. 2 is a speed-time diagram illustrating the braking operation of the invention.
Figure 3:
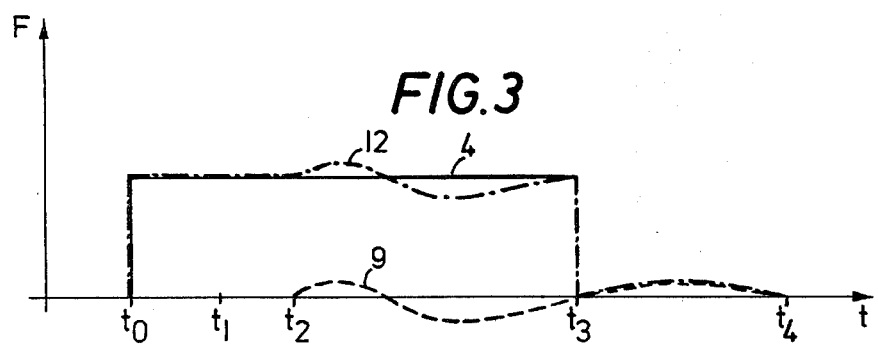
FIG. 3 is a force-time diagram showing the braking force.

In FIG. 2, the actual speed is plotted as a dash-dotted curve b. Up to the instant $t_0$, actual speed and reference speed (curves b and a) are equal to each other. Then, due to the building up of the braking force, actual speed b slowly decreases. The signal coming from limit value stage 2 at the same time actuates a computer 5 which, in accordance with a predetermined desired speed function (stopping distance curve), presets the reference speed values which depend on the target distance. In the course of this process, first, the actual speed $V_{act}$ at the instant $t_0$ is picked up and stored up to the instant $t_1$ (curve c of FIG. 2). It is only then that the delivery of the computer (output) is started. This delay time up to $t_1$ corresponds to the average build-up time of the braking force. The stored value c is the initial set point of the reference speed values to be computed as a function of the covered distance and furnished by computer 5, which values represent the allowable speed for ensuring a definite braking distance. The reference speed values preset by the computer gradually decrease toward the target speed a'. In FIG. 2, the speed curve of the reference values furnished by the computer, starting from instant $t_1$, is shown as a dashed line d.

Through a switching element 6, which is also actuated by limit value stage 2, reference values d of the computer are applied to a maximum evaluator 7 permitting the passage of only the higher signal of those signals applied to its inputs A or B. As is well known, such as maximum evaluator comprises inputs which, in the simplest design, are decoupled by means of diodes. At the instant $t_1$ (FIG. 2), the set target speed a' is still substantially lower than the reference value d of the instantaneous permissible speed determined by computer 5. In consequence, value d provides the reference input for a braking force controller 8, known per se, with a variable proportional amplification factor which, with the approach to the target speed, increases up to its full degree of amplification in accordance with a speed-dependent function, while, at the same time, control signals for correcting braking forces are delivered. These control signals for correcting braking forces combine, with the correct mathematical relationship, to the basic braking force control signal. The controller operates in accordance with the following function:

$$\Delta b = \frac{k(2\Delta V + \Delta V^2)}{(V_{act} - V_{des\text{-}target})^2}$$

wherein:
$\Delta b$ = delay variation
k = a fixed amplification factor
$\Delta V$ = variance between desired and actual speed
$V_{act}$ = actual speed
$V_{des\text{-}target}$ = target speed aimed at After comparing the reference value with the actual value of the speed, braking force controller 8, as soon as it is switched on, delivers control signals 9 for correcting braking forces. However, braking force controller 8 is switched on by computer 5 only at the instant $t_2$ at which the reference speed values d should already securely and fully correspond to the actual speed $V_{act}$ obtained through the basic braking force 4. This again applies to the ideal track and train mass conditions.

FIG. 2 shows that, at the instant $t_2$, the actual speed b, as indicated for example, still exceeds the reference speed (curve d) preset by computer 5. Consequently, controller 8, as soon as it is switched on by computer 5, through a line 10, delivers correcting control signals 9 (curve 9 in FIG. 3) of the proper polarity for correcting braking forces, which signals are added to the basic control signal 4 at a summing point 11. Such a summing point may comprise an operational amplifier, for example, of the type 741, according to FIG. 11.1, page 196, of the above-mentioned publication by Tietze/Schenk. The resulting curve of the total braking force is indicated at 12 in FIG. 3. The magnitude of the total braking force control signal is increased or decreased as needed.

Shortly prior to reaching the newly desired or target speed a' at an instant $t_3$, the basic braking force 4 is switched off and the connections are changed to the effect of having target speed a' as the new reference input (FIGS. 2 and 3). The change-over process is effected by limit value stage 2 which switches back as soon as the speed difference drops below a minimum value.

Depending on the instantaneous applied braking force F, the change-over (instant $t_3$) takes place sooner or later, i.e., with a higher braking force, sooner. The reason therefor is that, with a higher braking force, the brake release takes a longer time. The return of limit value stage 2 to its original condition causes switching elements 3 and 6 to open. Thereby, the deliveries of reference speed values from computer 5 and of basic control signal 4 for the braking force are stopped. Capacitor 13, which is charged with the last computer output, discharges through its parallel resistor 14 to the level of the now applied voltage of target speed a' ($t_4$, FIG. 3), which means that, due to the discharge curve, a smooth transition is obtained for the reference input to controller 8. Finally, the initially still effective input B of maximum evaluator 7 is relieved by input A where the target speed a' is applied.

The invention makes it possible to provide a reproducible braking of locomotive-drawn railroad trains which is accurate as to the deceleration distance.

While a specific embodiment of the invention has been shown and described in detail to illustrate the application of the principles of the invention, it will be understood that the invention may be embodied otherwise without departing from such principles.

What is claimed is:

1. A method of braking a rail vehicle from a first speed to a target speed in a predetermined distance, said method comprising the steps of: generating a predetermined, fixed braking force upon actuation of a vehicle brake, generating a first, fixed braking force signal that has an amplitude corresponding to said braking force; generating a second signal corresponding to the actual speed of said vehicle; delaying said second signal for a first delay time; generating a third signal corresponding to reference speed values, said third signal having an initial maximum value corresponding to the delayed value of the signal corresponding to the actual speed of said vehicle at the time the brake is applied; generating, after a predetermined second delay time, a correcting braking force to modify the rate of change of speed of said vehicle to reach said target speed within said distance; combining said correcting braking force with said predetermined, fixed braking forces after said second delay time; removing said predetermined, fixed braking force when said vehicle slows down to a speed that differs from said target speed by a predetermined amount; thereupon generating a new correcting braking force based on the target speed; and applying said new braking force to brake said vehicle to said target speed.

2. In a method of braking rail-guided vehicles, as claimed in claim 1, the step of: switching off the fixed basic braking force control signal a predetermined period of time in advance of coincidence between the actual speed and the target speed as the actual speed approaches the target speed to be attained at the end of the deceleration distance.

3. In a method of braking rail-guided vehicles, as claimed in claim 2, effecting the switching to the target speed in a smooth transition in proportion to the average brake-release time.

4. In a method of braking rail-guided vehicles, as claimed in claim 3, effecting such smooth transition by following a substantially exponential function.

5. In apparatus for braking rail-guided vehicles automatically and accurately with respect to a deceleration distance, while using a computer which, in accordance with a function based on one of the time and the distance of deceleration, delivers speed values to a means controlling the braking force of the vehicle, the improvement comprising, in combination: a differential amplifier having respective inputs receiving first and second signal corresponding, respectively, to the target speed value and the actual speed value; a limit-value stage connected to and controlled by said differential amplifier; a first switching element connected to the output of said computer; a second switching element; said limit-value stage, upon receiving a signal exceeding a threshold value, actuating said computer and bringing said first and second switching elements into closed positions; a maximum evaluator having a pair of inputs; means connecting said first switching element to one input of said maximum evaluator; means applying the desired speed to the other input of said maximum evaluator; a braking force controller connected to and controlled by the output of said maximum evaluator; means supplying the actual speed to said braking force controller; said braking force controller being actuable by said computer; said braking force controller delivering braking force control signals to a summing point; and means providing a fixed basic braking force control signal to said second switching element, said second switching element, when in its closed position, supplying said fixed basic braking force control signal to said summing point.

6. In apparatus for braking rail-guided vehicles, the improvement claimed in claim 5, in which the threshold value of said limit-value stage is controllable through the braking force of the vehicle.

7. In apparatus for braking rail-guided vehicles, the improvement claimed in claim 5, including a capacitor and a resistor shunting the inputs of said maximum evaluator.

* * * * *